July 27, 1948.  J. MacMANUS  2,445,884
APPARATUS FOR HANDLING BREAD
Filed Dec. 2, 1942  4 Sheets-Sheet 1

INVENTOR.
JOHN MAC MANUS
BY
John C. Kerr
ATTORNEY

July 27, 1948.    J. MacMANUS    2,445,884
APPARATUS FOR HANDLING BREAD
Filed Dec. 2, 1942    4 Sheets-Sheet 2

INVENTOR.
JOHN MAC MANUS
BY
John C. Kerr
ATTORNEY

July 27, 1948.  J. MacMANUS  2,445,884
APPARATUS FOR HANDLING BREAD
Filed Dec. 2, 1942  4 Sheets-Sheet 3
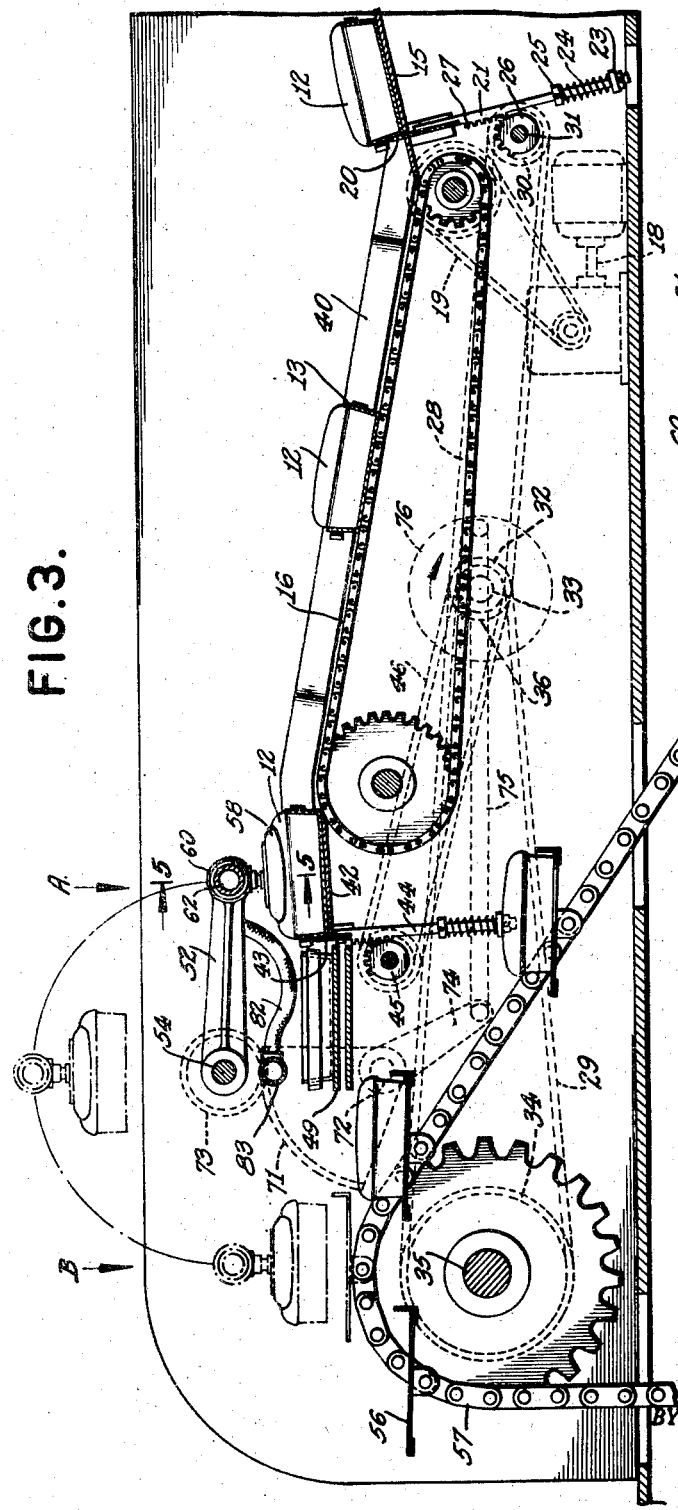
INVENTOR.
JOHN MAC MANUS
BY
John C. Kerr
ATTORNEY July 27, 1948. J. MacMANUS 2,445,884
APPARATUS FOR HANDLING BREAD
Filed Dec. 2, 1942 4 Sheets-Sheet 4
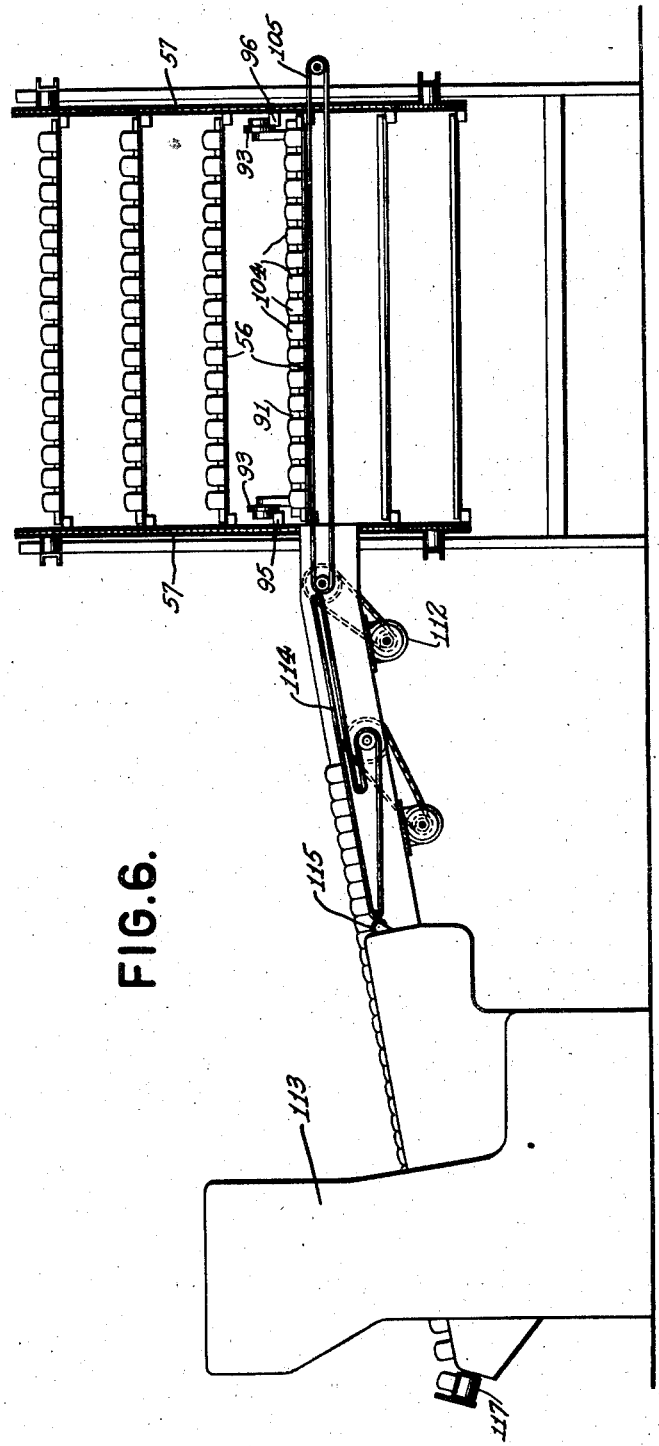
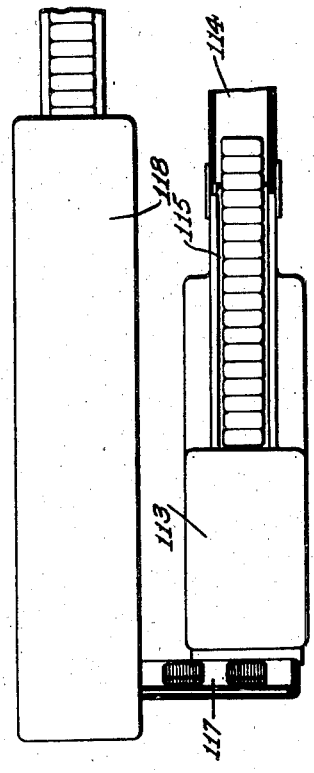
INVENTOR.
JOHN MAC MANUS
BY
John E. Kew
ATTORNEY Patented July 27, 1948

2,445,884

UNITED STATES PATENT OFFICE 2,445,884

APPARATUS FOR HANDLING BREAD

John MacManus, Yonkers, N. Y., assignor to Cushman's Sons, Inc., New York, N. Y., a corporation of New York Application December 2, 1942, Serial No. 467,609

2 Claims. (Cl. 214—1)

This invention relates to method and apparatus for handling bread mechanically.

Among the objects of the invention is to provide a method and apparatus whereby bread is treated and passed along through different operations without manual intervention and in a manner by which the duration of the treatment period covering all operations following baking and between an oven and a slicing or wrapping machine may be maintained constant for any run or series of runs of baked goods.

Another object of the invention is to provide means for conveying and treating bread during its passage from an oven to a slicing or wrapping machine which will obviate the chipping and shelling of crusts such as usually occur in consequence of the employment of semi-automatic processes commonly used.

Another object is to preserve the initial baked appearance of bread for delivery to customers in such state.

Another object is to present bread to a slicing machine in a sound condition and devoid of chipping and shelling, particularly of the upper crust, so as to minimize the percentage of crumbs which are produced during slicing and thereby minimize the possibility of later development of mold due to bits of crust entering the bread during the slicing operation.

In order to insure a high percentage of loaves of bread having perfect outer crusts one practice has been to make manual transfers of the loaves between operations after they leave the oven and up to and including the feeding of the loaves to a slicing or wrapping machine. Manual handling throughout increases the cost of bread to the consumer.

Notwithstanding the employment of available automatic devices workers have been needed to extract the loaves of bread from the baking pans, to effect transfers between conveyors and to select loaves from a picking or sorting table and feed them to a slicing or wrapping machine. In between the initial and concluding operations further manual handling has occurred, and mechanical means have been used to push the loaves about or to dump them onto a picking or sorting table. It has been common to find that the action of mechanically pushing the loaves and of removing the loaves from the cooler trays by mechanical means heretofore employed has resulted in chipping and shelling the crusts, and pushing sometimes causes crushing of the loaves. When dumped onto the sorting table the loaves usually fall and land in haphazard fashion, some upside down, and many bearing across each other in every direction with the result that the outside crusts are broken and the appearance of the bread is spoiled.

It is an object of the invention to avoid the use of a picking or sorting table and to cause the loaves to be transferred automatically in rows from cooling trays and conducted in line to the slicing or wrapping machine in such a manner that the loaves always rest upon their bases and no opportunity is provided for the loaves to fall upon each other to their injury.

In prior methods employing the picking or sorting table the cooling period is indefinite. The workers removing the loaves from the table select the loaves and line them up so that several can be picked up between the hands and placed in alignment on the conveyor leading to the slicing machine. Any loaves within reach are selected without regard to the order in which they were dumped upon the table and frequently loaves of bread pass the picking station and travel around with the sorting table one or more times. The result is that such loaves are subjected to a longer cooling period than that to which the initially picked loaves are subjected. The result is that the loaves of bread of any one baking run have different cooling periods covering the time they leave the oven until the time they are wrapped. The present invention assures that each loaf of bread will be exposed to a constant cooling period. The object attained is that all the wrapped loaves of bread are assured a constant moisture content. Furthermore, the manual alignment for presentation of the loaves to the slicing or wrapping machine is made unnecessary, since this is automatically accomplished and without any interruption in the continuity of the treatment of the bread.

Further and other objects of the present invention will be hereinafter set forth in the accompanying specification and claims and demonstrated by the drawings which show by way of illustration the preferred embodiment and the principle of my invention, and what I now consider the best mode in which I have contemplated applying that principle. Other embodiments of the invention employing the same principle may be used, and structural changes made as desired by those skilled in the art within the spirit of the appended claims and without departing from the present invention.

In the drawings:

Fig. 3 is a section on line 3—3 of Fig. 2.

Fig. 4 is a detail of suction controlling mechanism.

Fig. 5 is a section through a suction cup of the depanning mechanism.

Fig. 6 is a front elevational view of the mechanism by which loaves of bread are removed from the cooler trays and fed to a slicing machine.

Fig. 7 is a general plan of a slicing and wrapping machine.

In modern bakeries the time involved in preparing dough and making it ready for baking is carefully regulated and maintained constant, but no adequate means have been devised for assuring that the baked bread leaving an oven will be subjected to a constant period of treatment before it is wrapped. It is customary to wrap bread while it is slightly above room temperature and any variation in the elapsed time between the baking oven and the wrapping results in loaves which have varying moisture contents. In accordance with the present invention the elapsed time between baking and wrapping is maintained constant, with the result that greater uniformity in baked products ensues.

Figure 1:
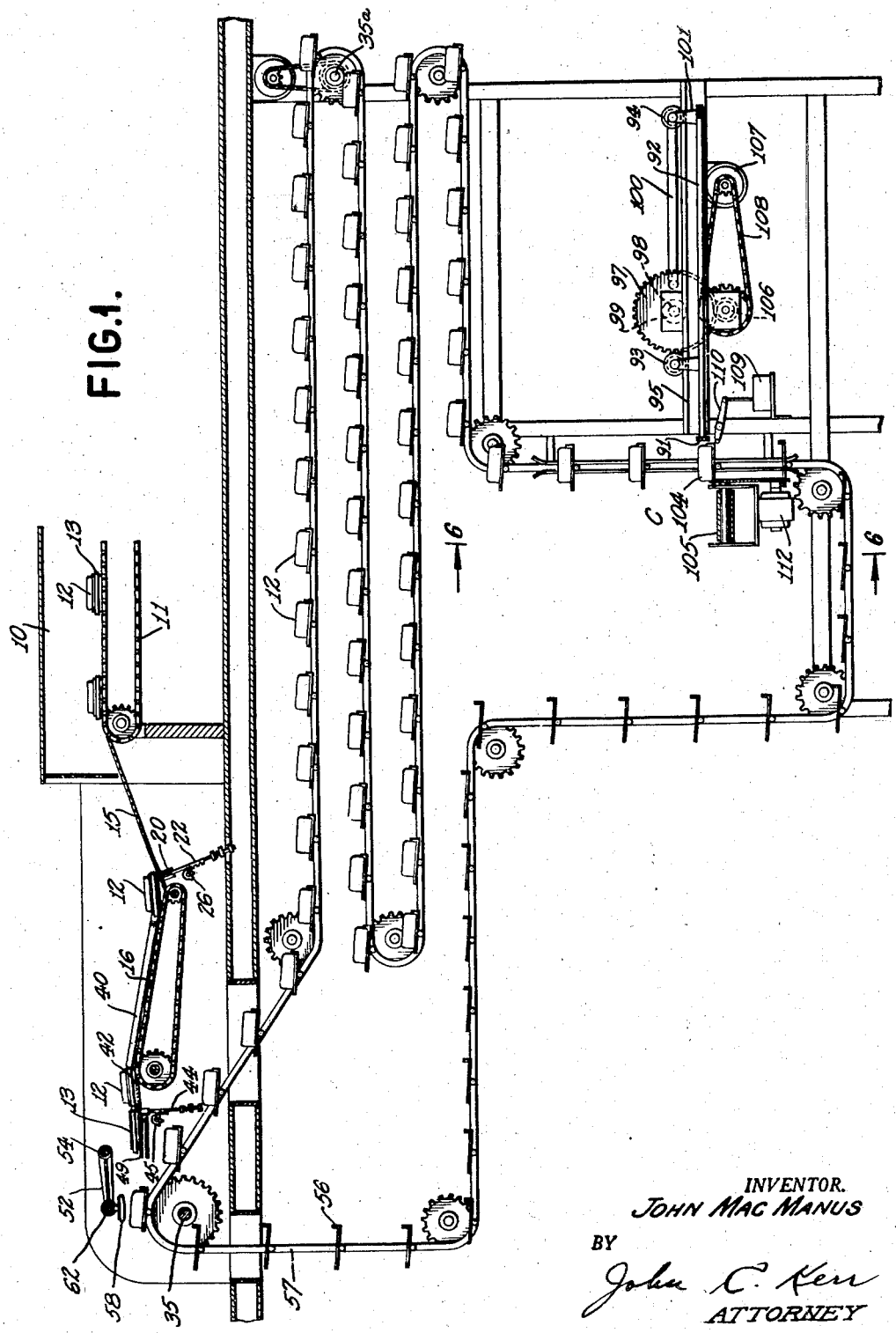
Fig. 1 illustrates a general assembly of arratus by which the method of the present invention may be practiced.

In Fig. 1 there is shown an oven 10 in which bread is baked as it passes through the oven on a continually moving conveyor 11. Loaves of bread 12 are introduced to the oven in pans or containers 13. The bread-containing pans are usually set down upon the moving conveyor in rows which proceed in sequence through the oven, but the invention is also applicable to the serial baking of individual loaves. In the present case, each of the pans illustrated is made to contain four loaves 12 which are uniformly spaced from one another, but the number of loaves in any one tray is immaterial.

The commercial form of oven is usually provided with a discharge ramp 15 onto which the pans are advanced by the conveyor. Upon reaching the lower end of this ramp the pans slide onto a travelling conveyor 16, and this conveyor carries the pans to a station located at A where the loaves are removed from the pans and the empty pans are taken away.

While it is possible to dispense with the conveyor 16 intermediate the oven and station A under certain conditions, this conveyor is desirable for use in assuring that pans of bread reach the de-panning station at A in due season for the automatic removal of the loaves therefrom. This can be accomplished by driving conveyor 16 at a greater rate of speed than the speed of the oven conveyor 11.

The conveyor 16 is driven from a motor and variable speed transmission unit 18 and a sprocket chain 19, Fig. 3. With this independent drive the speed of conveyor 16 may be adjusted to fulfill its intended function.

In order to preliminarily align the trays in each row of trays leaving the oven and to assist in providing regular intervals between the rows of successive trays, a stop bar or plate 20 is provided at the lower portion of ramp 15. This stop bar is supported by a number of movable rods or rack bars 21, 22, of which one is shown in Fig. 3. The upper portion of bar 20 constitutes fingers passing through slots in the plate forming ramp 15 and the bar is guided thereby. The upper ends of bars 21 and 22 are secured to stop bar 20 and their lower ends pass through holes in guide members 23. A spring 24 is provided on each bar 21, 22, between bearing member 23 and a collar 25 which is fixed to the bar, and this spring normally holds bars 21 and 22 and the stop bar 20 in elevated position, Fig. 3.

The stop bar assembly is lowered periodically an amount sufficient to permit the passage of a row of pans, and it is immediately returned to its elevated position by the action of springs 24 immediately following the passage of the released row of pans in order to be in position to stop the next oncoming row. This action is attained by mutilated gears 26 which engage teeth 27 on each of bars 21 and 22.

Mutilated gears 26 are rotated in synchronism with the bread-cooling conveyor described hereinbelow through a pair of sprocket chains 28 and 29, Figs. 2 and 3. Sprocket chain 28 engages a sprocket 30 on shaft 31 which carries the mutilated gears 26. Sprocket chain 28 is driven by sprocket 32 which is secured to a sleeve rotatively mounted on stub shaft 33. Sprocket chain 29 is driven from a sprocket 34 on shaft 35 and in turn drives sprocket 36 which turns as a unit with sprocket 32. Shaft 35 revolves constantly while the apparatus is in operation.

It is apparent that the duration of the period of withdrawal of stop bar 20 from above the surface of ramp 15 is determined by the number of teeth in mutilated gears 26 and that mutilated gears having different numbers of teeth can be substituted for changing the timing of the period of its withdrawal to accommodate pans of bread of different lengths.

When a row of pans is released by stop bar 20, it immediately descends into contact with conveyor 16 by which it is advanced toward the depanning station located at A.

Figure 2:
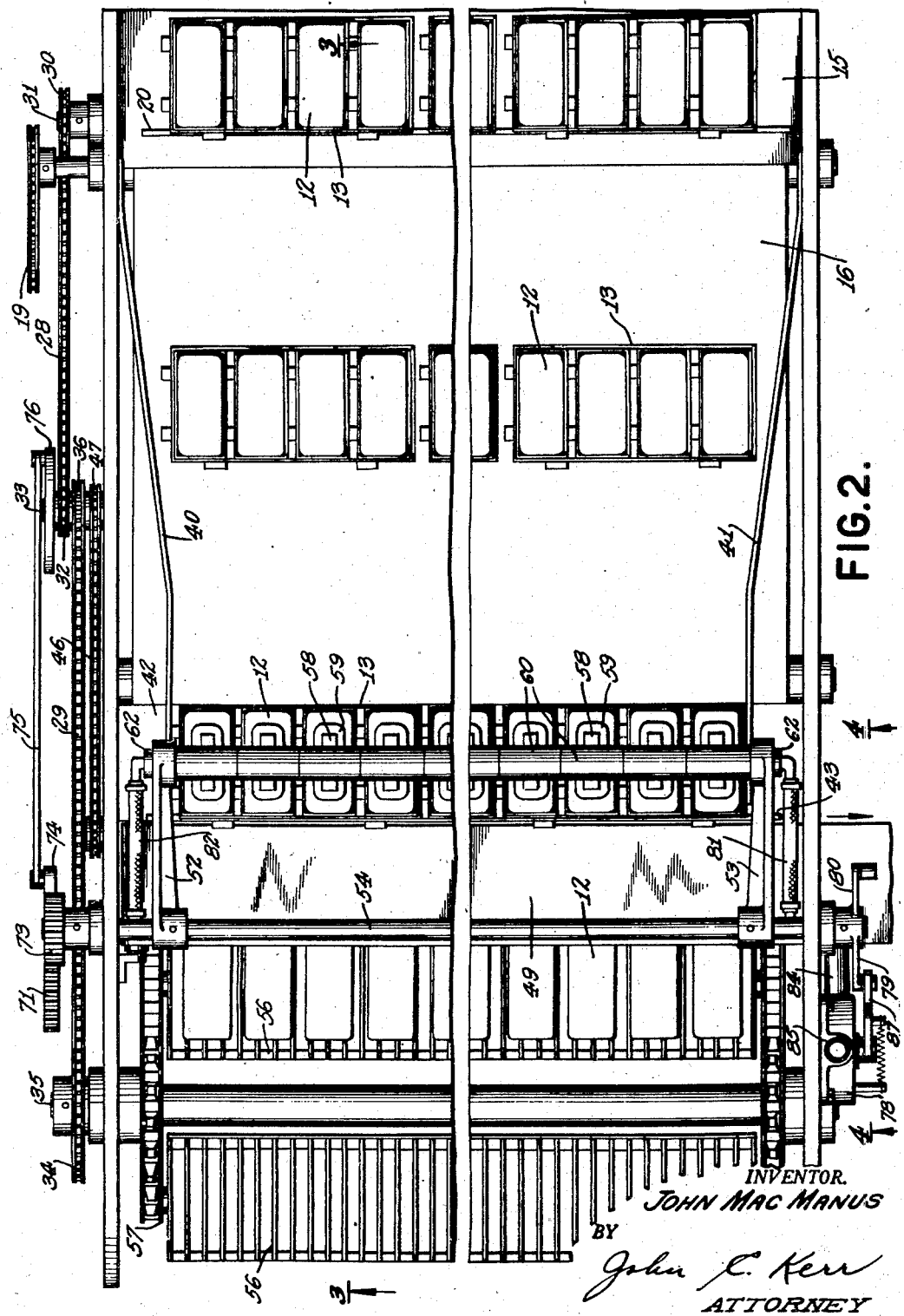
Fig. 2 is a plan of the de-panning station and its approach as shown in Fig. 3.

While being carried along conveyor 16, the pans in each row are justified with respect to the direction of their travel by means of a pair of inclined guides 40 and 41, Fig. 2. The effect of these guides is to consolidate separated pans into a compact row of pans so as to bring the pans into correct registry with the automatic de-panning mechanism which removes the loaves of bread from the pans at station A. It is apparent that this justifying of the pans may be attained at any point in advance of station A, and even in the oven itself by locating lugs on the oven conveyor 11 to determine their position thereon.

A table or shelf 42 is provided at station A to receive the pans from conveyor 16. At the discharge edge of the shelf there is located a stop bar 43 which temporarily halts the movement of the pans and definitely locates them during the de-panning operation. This bar, rack bars 44 and associated mechanism are similar in construction to the stop bar 20 and rack bars 21, 22 which are located at the lower portion of ramp 15, and therefore need not be further described in detail. Rack bars 44 are operated through mutilated gears 45 by means of sprocket chain 46 which is driven from sprocket 47. Sprocket 47 is fixed to sprocket 36 and it is driven therewith through sprocket chain 29 in the manner previously described.

The reciprocation of stop bar 43 is so timed as to hold a row of pans on shelf 42 until the loaves of bread therein have been extracted. Thereafter stop bar 43 is depressed below shelf 42 and the row of empty pans is permitted to be advanced onto a travelling belt 49 whose carrying surface is disposed alongside of shelf 42.

This travelling belt 49 immediately carries the empty row of pans away from the de-panning station. The belt may be continued and caused to form part of another conveyor (not shown) which is arranged to return empty pans to the front end of the oven for refilling.

The automatic mechanism for extracting the loaves of bread from their containing pans comprises a pair of arms 52, 53 which are mounted upon a rocker shaft 54 by which they are oscillated between station A and station B where a row of loaves is deposited upon a tray 56. Successive rows of loaves are deposited serially on successive trays. These trays are carried by a conveyor 57 which has a prolonged course of travel to effect cooling of the bread. The cooling period is determined by the rate of travel of the conveyor, its length of travel, and the temperature of the air through which the conveyor passes. The conveyor is propelled from one of its supporting shafts, such as, shaft 35a, Fig. 1.

The loaves are extracted from their respective pans by means of suction apparatus including a gang of suction cups or mouthpieces. Each suction cup 58 is open at its underside for engagement with the upper surface of a loaf of bread. This suction cup may be made of any suitable material, such as felt or neoprene, which is sufficiently pliable to rest lightly against the upper surface of the bread. The lower portion or rim 59 is flexible and shaped to effect a secure seal.

Each cup 58 is supported from a sleeve 60 which has an annular inside passageway 61. The length of each sleeve 60 is such as to properly space the suction cups in accordance with the spacing of the loaves of bread on shelf 42. The sleeves are mounted upon a hollow tube 62 which is supported between the ends of arms 52 and 53. Sets of perforations 63 are provided in this tube at spaced intervals, which register with the annular recess in each sleeve, so that suction may be maintained in the cups during a bread-lifting and carrying operation.

It is customary originally to fill each pan with dough in lumps of the same weight and size. This results in producing loaves of bread of uniform, general appearance. Nevertheless, it is not unlikely that some of the loaves will have their upper surfaces at different elevations. Because of this, provision is made to permit the suction cups 58 to press equally upon each loaf. This is accomplished by supporting each suction cup 58 from its associated sleeve 60 by means of telescoping sleeves 65 and 66. The extension of the sleeves is limited by a flange 67 which normally rests upon a shoulder 68 in sleeve 66, Fig. 5. A light spring 69 may be used, if desired, to urge the suction cup downward into contacting relationship with the topside of a loaf of bread.

The extracting mechanism is timed to operate in synchronism with the travel of conveyor 57 of the cooling system. This is accomplished by a gear sector 71 which is pivoted at 72 and engages spur gear 73 at the end of shaft 54, Figs. 2 and 3. The drive for the gear sector is obtained through an arm 74 which is connected by a pitman 75 having its other end connected to a crank 76. This crank is secured to the sleeve upon which sprocket 36 is mounted and it is therefore driven through sprocket chain 29. Consequently, shaft 54 and the suction cup supporting arms 52 and 53 will be caused to oscillate in accordance with the movement of the bread-cooling conveyor 57. Trays 56 are spaced along the bread-cooling conveyor at such distances as will position a tray at station B for each oscillation of the bread-extracting mechanism.

In order to extract the loaves of bread from the pans at station A, it is necessary that suction be established in the suction cups just before the cups are brought against the loaves and maintained until the cups have been moved to station B. At this point the suction is discontinued and the loaves are permitted to drop upon an empty tray 56. The timing of the suction is accomplished by a valve 78, Figs. 2 and 4, which is shown in open position in Fig. 4. This valve is successively opened and closed by arms 79 and 80 which are mounted upon shaft 54.

The ends of hollow tube 62 are connected by flexible hoses 81, 82 to a pipe 83 which has connection through pipe 84 with valve 78. Exhaustion of this suction system is obtained through conduit 85 which has connection with a source of subatmospheric pressure (not shown). As shaft 54 is rocked and arms 52 and 53 arrive at station B, arm 80 will operate to depress arm 87 of the valve 78 and close communication between conduit 85 and pipe 84. The vacuum remains cut off during the return motion of arms 52 and 53 to station A and until arm 79 on shaft 54 raises arm 87 of the valve. Arm 87 is biased by a spring to remain in either of the opened or closed positions for the valve.

The bread-cooling conveying system carries individual trays progressively to an unloading station at C, Fig. 1. At this station the loaves of bread on each tray are removed simultaneously without interruption of the continuous motion of the cooling conveyor. For accomplishing this a pusher bar 91 is provided which is mounted upon a carriage having side bars 92 and two pairs of rollers 93, 94, which support the carriage on tracks 95, 96, Fig. 6. The carriage and pusher bar 91 is reciprocated by a gear and crank assembly 97 which is mounted upon a shaft 98 journaled in bearings 99. These bearings are mounted upon stationary tracks 95 and 96. The pin at the end of this crank is connected to a pitman 100 which has its other end connected to bracket 101 extending from the carriage.

As gear 97 makes one revolution, the carriage is advanced and returned to its normal position, as shown in Fig. 1. During the first half of this action, a row of loaves at 104 is ejected from its supporting tray and placed upon a conveyor 105. The pusher bar 91 is a straight bar which is parallel to the conveyor and it automatically aligns successive rows of loaves on conveyor 105.

Gear 97 meshes with gear 106 which is driven from motor 107 by the sprocket and chain connection 108. The operation of the motor is electrically controlled by circuits (not shown) which are controlled automatically from a switch 109. This switch is periodically operated through mechanism having a lever 110 by engagement of the lever by a moving tray or by some other part of the conveyor. The timing of this operation is such that the pusher bar 91 will clear each tray, push the loaves therefrom and then return to its position of rest. This cycle is repeated as each tray arrives opposite the pusher bar.

Conveyor 105 is operated by the motor 112. This motor is also controlled by switch 109. The control is such that conveyor 105 is stopped when pusher bar 91 is operating to remove a tray load of loaves and deposit them upon the conveyor. Following their deposit on the conveyor, the conveyor is operated until it has advanced at least the distance required to provide space thereon for the next row of loaves to come from the next succeeding tray.

Conveyor 105 is aligned with a slicing machine 113, Fig. 6. The row of loaves of bread received on conveyor 105 are transferred to a second conveyor 114 which in turn transfers them to the travelling belt 115 of the bread-slicing machine. The relative speeds of belts 105, 114 and 115 preferably are such as to advance successive loaves into contact with each other for delivery to the knives of the slicing machine as shown at 113. Upon being sliced, the loaves are individually delivered to a receiving belt 117 which immediately conveys them without interruption to a wrapping machine 118 by which they are individually wrapped.

It is apparent from the foregoing description that there is a continuity of flow of the loaves of bread without interruption from the oven to the wrapping machine. The bread is at no time required to be manually handled and each loaf is always upright so that no pressure is brought to bear upon the relatively fragile outer crust at the top of the loaf.

I have pointed out hereinbefore that an advantage in preserving the original condition of the top crust is found in the diminution of the amount of crumbs produced by the slicing machine, as compared to slicing loaves which have their crusts broken. I wish also to point out that in some cases it is desired to wrap the bread without previously slicing it. When the method of the present invention is employed, the original appearance of the crust is maintained.

Whether or not a slicing operation is performed, the bread has a constant moisture content since there has been no opportunity for the loaves of bread to get out of the sequential order in which they left the oven during any part of the treatment preceding the wrapping operation and the successive steps have been carried out as parts of a continuous process operating throughout a constant period of time.

What is claimed is:

1. In apparatus for removing bread from pans and depositing the bread without tumbling it on its top crust, the combination comprising a stationary platform for receiving pans of bread, means cooperating with said platform for locating the pans containing bread on said platform, a travelling conveyor, trays spaced along said conveyor, a pneumatic chuck for engaging the top crust of a bread contained in a pan on said stationary platform, said chuck having a flexible cup shaped to conform with varying shapes of the top crusts of bread, means for carrying said chuck between said stationary platform and said conveyor, said carrying means comprising a horizontally pivoted arm and a hollow shaft for pivotally mounting said chuck, said hollow shaft and chuck being ported whereby air may be withdrawn from said chuck and said chuck is pivoted on said hollow shaft, and means for controlling the suction of said chuck and the operation of said chuck-carrying means to synchronize the lifting of breads from pans successively located on said platform and the placing of the breads on different trays on said conveyor.

2. Apparatus for handling bread comprising in combination a stationary platform, a travelling conveyor having its discharge end adjacent said platform, a chute discharging onto the receiving end of said conveyor, a movable stop extending above the surface of said chute for obstructing movement of pans from said chute, a second movable stop extending above said stationary platform in the locality of its discharge edge, means for extracting a loaf of bread from a pan standing on said stationary platform, means for driving said conveyor, and means actuating said movable stops in timed relation to the movement of said bread extracting means whereby pans containing bread are periodically released to move onto said travelling conveyor from said chute and a pan will be held on the stationary platform long enough for enabling the extraction of the bread therefrom.

JOHN MacMANUS.

REFERENCES CITED

The following references are of record in the file of this patent:

UNITED STATES PATENTS

| Number | Name | Date |
| --- | --- | --- |
| 1,060,948 | Schuster | May 6, 1913 |
| 1,112,816 | Manchester | Oct. 6, 1914 |
| 1,165,035 | Streit | Dec. 21, 1915 |
| 1,228,690 | Monnet | June 5, 1917 |
| 1,279,563 | Lowell | Sept. 24, 1918 |
| 1,345,079 | Fisch | June 29, 1920 |
| 1,348,341 | Winkley | Aug. 3, 1920 |
| 1,427,679 | Eggert | Aug. 29, 1922 |
| 1,461,222 | Myers | July 10, 1923 |
| 1,473,996 | McGarry | Nov. 3, 1923 |
| 1,612,444 | Kimball et al. | Dec. 28, 1926 |
| 1,653,402 | Kaser | Dec. 20, 1927 |
| 1,885,142 | Reece et al. | Nov. 1, 1932 |
| 1,904,720 | Douglass | Apr. 18, 1933 |
| 1,955,655 | Purdy | Apr. 17, 1934 |
| 1,987,336 | Powell | Jan. 8, 1935 |
| 2,034,108 | Marresford | Mar. 17, 1936 |
| 2,215,193 | Reece | Sept. 17, 1940 |
| 2,246,675 | Gronemeyer | June 24, 1941 |
| 2,271,937 | Engels | Feb. 3, 1942 |

Certificate of Correction

July 27, 1948.

Patent No. 2,445,884.

JOHN MacMANUS

It is hereby certified that error appears in the printed specification of the above numbered patent requiring correction as follows: Column 5, line 6, after the word and period "refilling.", insert the following paragraphs:

Perfection in the appearance of bread is a matter of economical importance particularly to bakeries having a large retail trade. This is because perfection in appearance is synonymous with quality to the purchasing public and the customer is inclined to select products having the best appearance. Since a high percentage of the bread which is sold directly to the retail trade is not wrapped and can be easily inspected, it is important that bakeries supplying retail stores maintain perfection in their products and produce bread devoid of checking, shelling and of all other injuries capable of detracting from a perfect loaf of sound appearance.

The removal of loaves from their pans and the subsequent manipulating of the loaves during cooling are among the operations which afford occasion for disfiguring bread, particularly by breakage of the fragile outer crust. The initial baked appearance of bread is assured through the process of the present invention. Reliance upon the skill of an operator for extracting the loaves of bread from their pans is avoided by fully automatic mechanism which deposits the loaves top side up and in trays in which they are transported during a cooling period.

and that the said Letters Patent should be read with this correction therein that the same may conform to the record of the case in the Patent Office.

Signed and sealed this 26th day of October, A. D. 1948.

[SEAL]

THOMAS F. MURPHY,
*Assistant Commissioner of Patents.*